(12) United States Patent
Maron et al.

(10) Patent No.: US 8,329,237 B2
(45) Date of Patent: Dec. 11, 2012

(54) METHODS FOR HEAT TREATMENT OF MILK

(75) Inventors: Hans Paul Maron, Eagle, ID (US); Patricia Ruth Corby, Eagle, ID (US)

(73) Assignee: Fair Oaks Farms Brands, Inc., Chicago, IL (US)

( * ) Notice: Subject to any disclaimer, the term of this patent is extended or adjusted under 35 U.S.C. 154(b) by 892 days.

(21) Appl. No.: 11/821,446

(22) Filed: Jun. 23, 2007

(65) Prior Publication Data

US 2008/0008813 A1 Jan. 10, 2008

Related U.S. Application Data

(60) Provisional application No. 60/816,035, filed on Jun. 23, 2006.

(51) Int. Cl.
*A23C 9/00* (2006.01)
(52) U.S. Cl. .......... 426/491; 426/587; 426/521; 426/522
(58) Field of Classification Search .......... 426/490–495, 426/520–522, 580–588, 34; 99/483
See application file for complete search history.

(56) References Cited

U.S. PATENT DOCUMENTS

| 2,860,057 | A | * | 11/1958 | Wilcox ............... 426/587 |
| 3,054,674 | A | | 9/1962 | Calbert et at ............ 99/55 |
| 3,758,313 | A | * | 9/1973 | Scott ............... 426/393 |
| 5,762,989 | A | | 6/1998 | Savello |
| 2004/0040448 | A1 | * | 3/2004 | Dunker et al. ........... 99/452 |

FOREIGN PATENT DOCUMENTS

WO WO 92/21245 A1 12/1992

OTHER PUBLICATIONS

Kocak, H.R., "Dairy products manufactured from whole milk concentrated by reverse osmosis. I. UHT products", Australian Journal of Dairy Technology, 1985, XP-002552725, (1 page).
Hinrichs, J., "UHT processed milk concentrates", Lait Chair for Food Process Eng., vol. 80, No. 1, 2000, XP-002552726, pp. 15-23.
Smith, Mark et al., "Aseptic Rennet Coagulation of Ultra-High Temperature Processed Milk Concentrates", Journal of Dairy Science, vol. 79, No. 9, 1996, XP-002552727, pp. 1513-1520.

* cited by examiner

*Primary Examiner* — Steven Leff
(74) *Attorney, Agent, or Firm* — Winstead PC

(57) ABSTRACT

A process for producing a concentrated, sterilized liquid milk product comprising the steps of (a) partially concentrating milk or a milk product, and (b) sterilizing a partially concentrated milk product.

9 Claims, 1 Drawing Sheet

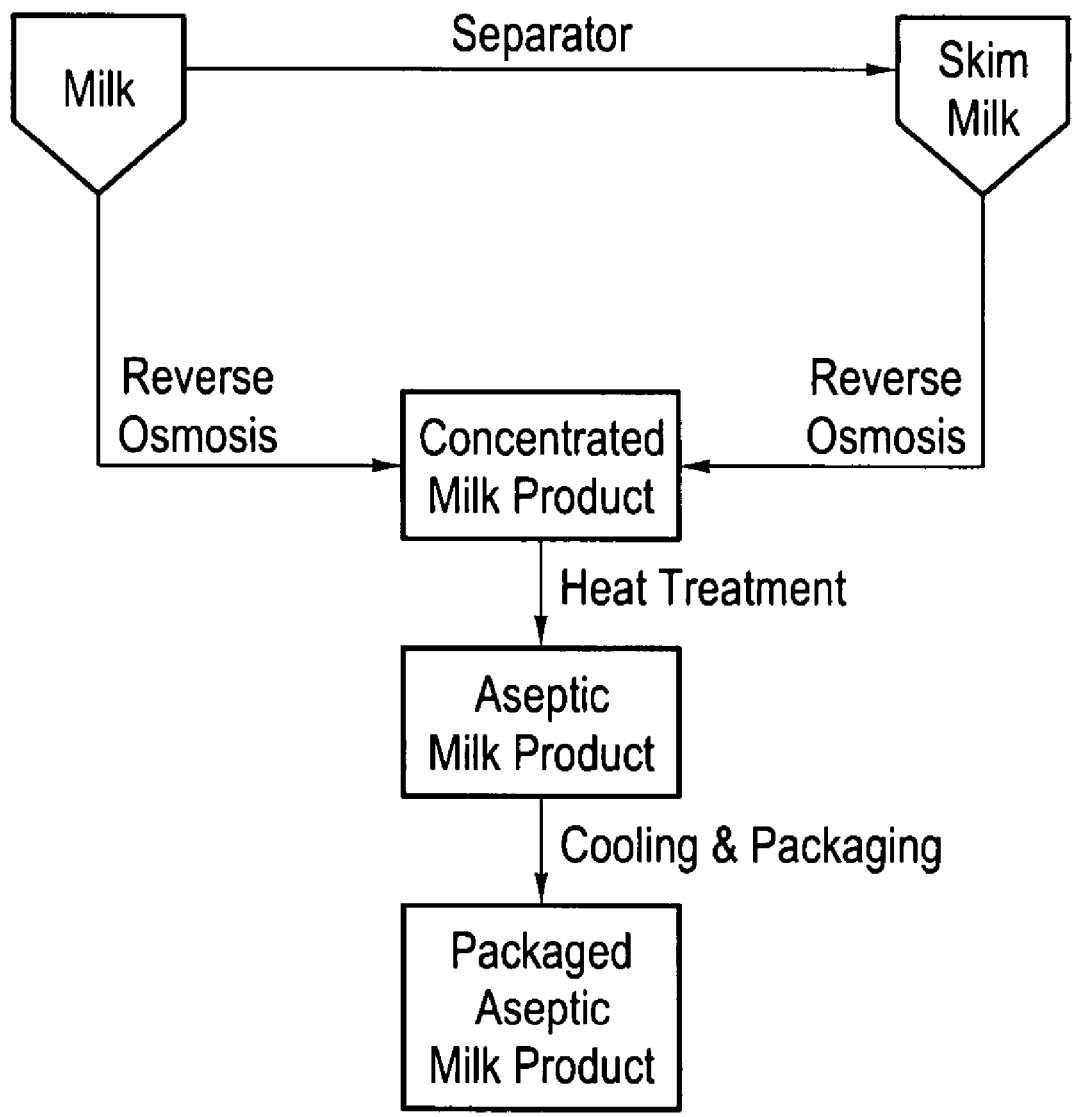

METHODS FOR HEAT TREATMENT OF MILK

CROSS REFERENCE TO RELATED APPLICATIONS

This application claims the benefit of U.S. Provisional Application No. 60/816,035, filed Jun. 23, 2006.

BACKGROUND OF THE INVENTION

The invention relates to an improved process for the heat treatment of liquid milk products including food products based on milk and containing starch or other carbohydrates. It is particularly concerned with a process for the treatment of fresh cream, fresh milk, skim milk, flavored milk, lactose reduced milk and other liquid milk products to prolong the shelf-life of such products.

It is well-known that the storage life of cream, milk and other liquid milk products is often very short when these products are stored at ambient temperature, e.g. 10° to 30° C., and that the shelf-life of such products can be prolonged by storing the products under refrigerated conditions, e.g. 5° to 10° C. Such refrigeration prolongs the shelf-life of the liquid milk products by up to 10-20 days.

The deterioration in the quality of liquid milk products such as cream and milk is due to microbiological activity that normally develops within a few days following storage to a level such that the product takes on unacceptable flavor characteristics and frequently undergoes unacceptable physical changes. The microbiological activity that gives rise to these unacceptable changes is not prevented by conventional pasteurization treatment and it has been proposed to subject dairy products to higher temperature heat treatments in order to inhibit this microbiological activity. Such heat treatment may involve flash-heating to about 145° C. (293° F.), the so-called ultra high temperature (UHT) treatment. Milk can be made commercially sterile by subjecting it to temperatures in excess of 100° C., and packaging it in air-tight containers. The milk may be packaged either before or after sterilization. The basis of UHT, or ultra-high temperature, is the sterilization of food before packaging, then filling into pre-sterilized containers in a sterile atmosphere. Products which have been heat-treated in this way have prolonged shelf-lives of several months. However, products treated in this manner suffer from the severe disadvantage that they lose their natural, fresh taste and take on a characteristic burnt taste that is less attractive to the consumer.

It has also been proposed to improve the keeping properties of fresh milk by subjecting the milk to a short-time heat treatment at 100° C.-145° C. (212° F.-293° F.), preferably about 105° C. (221° F.), followed by packaging of the heat-treated milk at a temperature of 70° C. to 80° C. (158° F.-176° F.) and then subsequently cooling the packaged milk in a predetermined manner. However, from a practical stand point, by operating at the preferred temperature of 105° C. (221° F.), no significant prolongation of shelf-life is obtained, while if the product is given a conventional UHT treatment it immediately takes on the unacceptable "sterilized" or "burnt" flavor.

Shelf stable and aseptic concentrate milks available in the market place today use a condensing technology to reduce the water content of the starting milk material that involves the use of a pre-heat treatment or pasteurization. They are traditionally sold as "condensed milks" packaged in cans or packages. These products are condensed by a heating process and as a result, there is substantial damage to the structure of the milk, which affects the ability of the concentrated product to be rehydrated. Furthermore, condensation by heating results in a lowering of pH (increase in acidity) that contributes to the faster spoilage of the concentrated product, and damages the structural integrity of the product. Additionally, the increased acidity of heat-based concentrated products results in denaturation of the milk components, for e.g., milk proteins, which in turn causes the milk product to separate out into a particulate phase and a liquid phase. Such phase-separated products are visually unappealing and must be thoroughly shaken prior to use or consumption.

Additionally, the flavor profile of the heat-concentrated product is different from that of the raw milk or skim milk starting material. Since these products typically have additional heat applied to them by the UHT pasteurization process, they acquire a "burnt" or "sterilized" flavor that is disfavored by consumers.

Consequently, there is a need for a heat-treatment process that is capable of inhibiting the microbiological activity in liquid milk products to an extent which will permit the product to be stored without refrigeration, for prolonged periods of time, e.g. in excess of four (4) weeks and up to six (6) months. There is also a need for processes that produce liquid milk products that have extended shelf lives without suffering from the ills of microbial spoilage. Furthermore, there is a need for a process that produces an aseptic milk product using heat treatment steps, while at the same time avoiding the difficulties of the unacceptable "burnt" or "sterilized" flavor.

The present invention is based upon the premise that by using non-heating processes for the concentration of the raw material coupled with the careful selection of the heat-treatment temperature and time of exposure, it is possible to inhibit microbiological activity in the treated product when it is stored in sealed containers at 10° C. to 30° C. (50° F.-86° F.) for long periods of time while, at the same time, producing a product that is free from the characteristic "burnt" flavor and whose taste is indistinguishable from the fresh product.

SUMMARY OF THE INVENTION

An embodiment of the invention is directed to a process for producing a concentrated and sterilized milk product comprising the steps of performing a concentration process by reverse osmosis on a starting material comprising milk or a milk product and forming a partially concentrated milk product, and, performing a sterilization process on said partially concentrated milk product by heating.

An embodiment of the invention is directed to a process for producing a concentrated and sterilized milk product comprising the steps of concentrating raw whole milk or skim milk by a cold reverse osmosis process, and heating the concentrated product at a first elevated temperature, followed by heating at a second elevated temperature.

An embodiment of the invention is directed to a concentrated, sterilized milk product produced by the processes of the invention.

BRIEF DESCRIPTION OF DRAWINGS

FIG. 1 shows, in block diagrammatic form, the steps used to produce an aseptic dairy product according to one embodiment of the process of the invention.

DETAILED DESCRIPTION OF EXEMPLARY EMBODIMENTS

An embodiment of the invention is based on using non-heating processes for the concentration of raw milk or skim milk. Use of non-heating concentration steps is coupled with the careful selection of one or more heat-treatment temperatures. In combining these two aspects of the invention, it is possible to inhibit microbiological activity in the treated product when it is stored in sealed containers at 10° C. to 30° C. for extended periods. Additionally, the use of a non-heating concentration process coupled with a sterilization step, produces a product that retains the fresh, natural milk flavor. Products prepared by embodiments of the invention are free from the "sterilized" or "burnt" flavor that are typical of products prepared by prior art methods that use heat to condense milk.

An embodiment of the invention provides a process for concentrating and sterilizing milk and other dairy products that creates an aseptic product that has been exposed to lower levels of heat. Another embodiment of the invention provides a process of producing a liquid milk product that has suffered no structural damage. A further embodiment of the invention produces a milk product that retains the natural milk flavor and taste.

The processes of embodiments of the invention achieve a product that retains the taste and flavor of natural milk. In particular, unlike other condensed products currently available in the market place that are condensed by heat treatment, the milk product achieved by the processes of the invention does not separate out into a particulate phase and a liquid phase. Therefore, the milk product achieved by embodiments of the present invention, does not need to be shaken before use, following prolonged periods of storage.

Accordingly, an embodiment of the invention provides a process for the production of a liquid milk product that is substantially free from micro-organisms that would bring about spoilage during storage of an untreated product at temperatures higher than the ranges provided by refrigeration.

An embodiment of the invention provides a process for producing a sterilized, concentrated milk product comprising the steps of partially concentrating milk or a milk product at or below 45° F., and sterilizing the partially concentrated milk product. In an embodiment of the invention, the sterilization process comprises heating the partially concentrated milk product through one or more high temperature treatments. In certain embodiments of the invention, the sterilization process comprises heating the partially concentrated milk product to a first elevated temperature. In some embodiments of the invention, the partially concentrated milk product that is heated at the first elevated temperature is further heated to a second elevated temperature.

The process of the present invention may be used for sterilizing any milk or liquid milk product, i.e., "starting material". In an embodiment of the invention, the starting material is preferably fresh whole milk or skimmed milk. In an alternate embodiment of the invention, the starting material is preferably cow's milk.

As used herein the term "milk" includes whole milk, skim milk, fat-free milk, low fat milk, full fat milk, lactose-free or lactose-reduced milk (produced by hydrolyzing the lactose by lactase enzyme to glucose and galactose, or by other methods such as nanofiltration, electrodialysis, ion exchange chromatography and centrifugation technology), concentrated milk or dry milk. Fat-free milk is nonfat or skim milk product. Low-fat milk is typically defined as milk that contains from about 1% to about 2% fat. Full fat milk often contains about 3.25% fat. As used herein, the term "milk" is also intended to encompass milks from animal and plant sources. Animal sources of milk include, but are not limited to, human, cow, sheep, goat, buffalo, camel, llama, mare and deer. Plant sources of milk include, but are not limited to, milk extracted from soy bean. In addition, the term "milk" refers to not only whole milk, but also skim milk or any liquid component derived therefrom. By "whey" or "milk serum" is meant the milk component remaining after all or a substantial portion of the milk fat and casein contained in milk are removed.

In an embodiment of the invention, the method for producing a liquid milk product comprises concentrating a starting material containing approximately 3 wt % of butterfat and approximately 9 wt % of solids-not-fat (SNF). The starting material is subjected to a separation step using a cold bowl separation step at 45° F. or less, wherein the cream is separated from the remainder of the milk to produce a skim milk product. The cold bowl separation method comprises the centrifugal separation of butterfat from the SNF at a temperature of 45° F. or less.

In an embodiment of the invention, the skim milk that is produced by the cold bowl separation process is concentrated for a sufficient length of time in the absence of heat, to remove water and form an intermediate liquid concentrated milk product having a SNF content of at least 20% by weight and a butterfat concentration of approximately 8 wt %. More particularly, the concentration process employed in an embodiment of the invention is performed at a temperature of 45° F. or less.

In an embodiment of the invention, the concentration process removes water from the starting material. In certain embodiments of the invention, the concentration process removes at least 50% of the water from the starting material. In this embodiment, the volume of the starting material is decreased by 50% after the concentration step, i.e., the concentrated product has a volume that is 50% of the volume of the starting material.

In an embodiment of the invention, the concentration process is performed by reverse osmosis. The reverse osmosis process employs a membrane filtration system having a molecular weight cut-off of about 100 Da at pressures ranging from about 450 psi to about 1500 psi. In an embodiment of the invention, a cold reverse osmosis process is employed. This process employs a single pass separation step using osmotic pressure, at a temperature of 45° F. or less. The reverse osmosis process retains all of the solids and minerals present in the starting material, and eliminates primarily water.

In an embodiment of the invention, an amount of unpasteurized cream (for example, the cream removed from the starting material in the separation step) is mixed with the intermediate milk concentrate to form a liquid blend having a predetermined range of fat content.

In other embodiments of the invention, a liquid milk concentrate is produced by mixing a sufficient amount of a stabilizer material with a predetermined amount of the intermediate milk concentrate. The stabilizer material ensures the uniform distribution of and prohibits separation and settling of milk solids in the liquid milk concentrate during storage, either before or after the sterilization process. The stabilizer material assists in the production of a protein complex for forming a stable dispersion of colloidal constituents and to substantially uniformly distribute the colloidal constituents in the liquid milk concentrate.

In an embodiment of the invention, the stabilizer material maintains the pH of the liquid milk concentrate in the range of about 5.5 to about 6.8, i.e., at the same pH range as the starting material, during the sterilization step. The stabilizer material is further effective for inhibiting thermal coagulation of milk proteins during or after sterilization. Additionally, the stabilizer materials inhibit the coagulation of proteins at the pH range of the milk concentrate. The SNF content in the liquid milk concentrate is at least about 20% by weight of the concentrate. Such a liquid milk concentrate can be reconstituted with water or any other suitable diluent to produce a reconstituted milk beverage having a SNF content of about 8% by weight, which is comparable to raw milk.

In certain embodiments of the invention, carrageenan or phosphate salts are used as stabilizing agents.

The liquid milk concentrate is subjected to a regimen of elevated temperatures to form the sterilized liquid milk concentrate of the invention. The final homogenizing and packaging of the sterilized milk concentrate forms the liquid milk concentrate package of the invention. In an embodiment of the invention, the sterilized liquid milk concentrate is mixed with a suitable quantity of water to form a beverage having the consistency and taste of milk. In another embodiment of the invention, the sterilized liquid milk concentrate is mixed with a diluent other than water to form a desired reconstituted milk beverage.

An aspect of the invention is directed to a heating step that includes initially heating a liquid milk concentrate to a first elevated temperature for a defined time period.

In an embodiment of the invention, following the step that heats the liquid milk concentrate to a first elevated temperature, the milk concentrate is heated to a second elevated temperature that is higher than the first elevated temperature. Heating the liquid milk concentrate to a second elevated temperature for a defined period of time produces a sterilized liquid milk concentrate.

In an embodiment of the invention, the process is conducted in a continuous manner. In the continuous process, the starting material flows from storage facilities through a concentration step followed by a sterilization step. The sterilized product is packaged for distribution.

In an alternative embodiment of the invention, the process is interrupted after the concentration step. In this embodiment of the invention, the product obtained by concentration is transported to a separate site and stored for future sterilization. When the need arises, the concentrated product is recovered from storage and subjected to the sterilization step.

In certain embodiments of the invention, when the concentration step and sterilization step are conducted at separate times, i.e., not in a continuous flow, the concentration step is augmented to achieve a higher concentration of the starting material than in the continuous process. For example, greater than 50% water is removed from the starting material, such that the volume of the concentrated product is less than 50% of the volume of the starting material. In certain embodiments of the invention, the concentration step is followed by an adjustment of the total solids and/or milk fat content of the concentrated milk product before it is subjected to the sterilization step. Thus, for instance, cream or butter oil may be added to increase the milk fat content and, especially when the concentrating step has provided a greater degree of concentration, the milk product may be diluted to reduce the total solids content. Bifurcating the concentration and sterilization steps is particularly convenient where concentrated skimmed milk is transported to a site for sterilization and it is desired to produce a product having the character of concentrated sterilized whole milk. In this case, the concentrated skimmed milk product would be supplemented with total solids and/or milk fat content in an amount that matches the profile of whole milk, prior to the sterilization step.

The concentrating step suitably involves a reduction in volume of the initial starting material. In an embodiment of the invention, at least 50% of the water is removed from the starting material. In another embodiment of the invention, greater than 50% of the water is removed from the starting material by a concentration process. More preferably, the concentrating step involves concentrating raw milk or a milk product such that the partially concentrated milk product contains at least about 20% w/w of solids-not-fat (SNF), and most preferably from 20 to 25% w/w SNF.

In certain embodiments of the invention, the concentration step may be effected by using a conventional milk concentrating apparatus. In other embodiments of the invention, the concentration step is carried out in a cold reverse osmosis system. In this reverse osmosis system, either raw milk or skimmed milk (in which butter fat has been removed from the raw milk) is passed through a series of pumps and membranes that use osmotic pressure to remove water from the starting material. The temperature during the reverse osmosis process is maintained under 45° F., and pressures are typically maintained at less than 450 psi. The concentration levels attained by the reverse osmosis system is about 2.5-fold.

In an alternate embodiment of the invention, the starting material of raw milk or skim milk is concentrated using an ultrafiltration step. In certain embodiments of the invention, a cold ultrafiltration process is employed. In this process, the starting material is passed through a single pass separation step. In certain embodiments of the invention, the ultrafiltration step is performed using a membrane filter that excludes components having a molecular weight of at least as low as about 1 kDa but not higher than about 10 kDa, at pressures between ranging from about 45 psi to about 150 psi. The cold ultrafiltration process is carried out at a temperature of 45° F. or lower. The concentration levels attained by the ultrafiltration process is about 3-fold.

In an embodiment of the invention, the pH of the intermediate milk concentrate prepared by the cold reverse osmosis process at 45° F. is unaffected by the concentration process. The absence of a change in pH is an advantage of the reverse osmosis concentration process, which is in contrast to heat-based concentration processes, where the pH of the concentrated material is lowered, i.e., more acidic, relative to the starting material.

In an embodiment of the invention, the process is interrupted after the concentration step. If the process is interrupted after the concentration step, the concentrated product is sent to a holding tank and maintained at a temperature of 38° F. or less.

When the process is to be interrupted after the concentrating step, the starting material is concentrated by removing greater than 50% of the water. In certain embodiments, the concentrated milk product is diluted and the fat content adjusted as necessary, prior to commencement of the sterilization step.

Following the concentration step, various concentrated products can be made including without limitation, non-fat, reduced fat, low fat, whole, chocolate, coffee, and lactose-reduced variants. All of the products are batched as a raw mixture of cream and concentrated whole or skim concentrated milks. In certain embodiments, additional processing aids and flavors may be added according to a predetermined formula.

Sterilization may be achieved by any conventional sterilization method, for instance, by heating the partially concentrated milk product in bulk, or preferably, in a continuous flow process wherein the milk product is passed over one or more conventional heat exchangers, such as conventional indirect plate, coiled tube or scraped surface heat exchangers or by ohmic heating. Heating rates and holding times may be selected as convenient depending on the equipment in use.

In an embodiment of the invention, an aseptic processing module for direct UHT treatment of liquid food products with direct steam injection is used.

A particularly advantageous regime is to heat the milk product to a high temperature in multiple stages. An embodiment of the invention provides a process for creating an aseptic dairy product wherein the product is subjected to a first heating step or "pre-heating" treatment at an elevated first temperature for a selected time period. The pre-heated product is then heated to an elevated second temperature that is higher than the pre-heating temperature. An example of a multi-stage heating regime involves a two-step heating process in which the first step takes the temperature of the concentrated product from its holding temperature of 40° F.-45° F. to 175° F.-177° F. The transition from a cold temperature to the first elevated temperature is completed in 45 seconds or less. The short transition time is critical to achieving a product that does not have a "burnt" flavor and whose structural integrity is maintained.

In an embodiment of the invention, the transition time to heat the concentrated milk product to the first elevated temperature is at least 45 seconds.

Upon reaching a first elevated temperature of 175° F.-177° F., the concentrated product is transitioned to a second elevated temperature of 283° F.-288° F. in 5 seconds or less.

In an embodiment of the invention the transition time to heat the concentrated milk product to the second elevated temperature is at least 5 seconds.

The product is held at the second elevated temperature for a period of 4-6 seconds. The hold period at the second elevated temperature is regulated by the FDA as a minimum length of time required to confer product sterility.

In an embodiment of the invention, a liquid milk product concentrated by reverse osmosis is subjected to a first heat treatment step ("pre-heat step") in a heat exchanger. Instantaneous heating to the sterilization temperature takes place in the steam injector by continuous injection of high pressure steam into the product. In the pre-heat step, the concentrated milk product is heated from a temperature of about 40° F. (temperature at which the concentration step is carried out) to a temperature of 177° F. This stage takes about 45 seconds for the product to be brought up to the pre-heat temperature of 177° F.

Following the pre-heat step, the product is transported through a direct steam injection chamber, where the product is heated to higher temperature in a second heat treatment step. In the second heat treatment step, the product is heated at a pressure above the product's boiling point. In certain embodiments of the invention, the product is heated from 177° F. to a temperature of 288° F. or above. The transition from 177° F. to the higher temperature typically takes about 5 seconds. In an embodiment of the invention, the steam injection heater uses a system of perforated injection tubes to force steam into the concentrated liquid milk product to provide almost instantaneous transfer of heat to the liquid.

The product is heated by a process of direct steam injection for a period of 4-6 seconds. In an embodiment of the invention, the concentrated liquid milk product is held at the higher temperature of 288° F. or above for 4 seconds.

Following the direct steam injection stage, the product is transferred to a flash chamber down leg for about 5-10 seconds. In the flash chamber down leg, the temperature and pressure of the product are immediately lowered. In an embodiment of the invention, the temperature is lowered to 177° F. The excess water added as steam is flashed off by evaporation in the flash chamber down leg.

In certain embodiments of the invention, the heated product is transferred to an aseptic homogenizer after the flash chamber stage. The homogenizer forces the milk through tiny openings to break up the fat. This step distributes the fat evenly through the milk and improves the stability of the final product. The homogenized product is transferred to a regeneration chamber where the temperature is maintained at 177° F. The transition of the milk product from the flash chamber down-leg through the homogenizer and back to the regeneration chamber takes about 25 seconds.

Following the homogenization step, the temperature of the product is lowered from 177° F. to between 76° F.-80° F. over a period of about 45 seconds. This cooling of the product may be achieved by any conventional means. A preferred way of cooling the sterilized product is accomplished through the use of a heat exchanger where the temperature difference between the cooling media, usually water, and the product is kept high.

In certain embodiments of the invention, following the temperature lowering step, the product may be stored in a holding tank in preparation for transportation and subsequent packaging.

In some embodiments of the invention, following the cooling step, the sterilized, liquid milk concentrate is subjected to lactase enzyme treatment. After treatment with lactase, the treated milk concentrate is stored in a holding tank, from where it is sent directly to an aseptic filler.

In an embodiment of the invention, the concentrated and heat-treated milk product of the invention is packaged as an aseptic product at 80° F. This product has an average shelf-life of 120 days at room temperature (25° C.) when left unopened. In alternate embodiments of the invention, the unopened aseptic milk product has a shelf life of up to 6 months. After the package has been opened, the milk product prepared by the methods embodied herein remains edible for up to 30 days.

In another embodiment of the invention, the concentrated and heat-treated milk product of the invention is packaged at 45° F. This product is marketed as an extended shelf-life product having a shelf-life of at least 60 days.

The invention will now be described by way of examples, with reference to the drawing in which FIG. 1 shows, in diagrammatic form, a system for producing concentrated sterilized milk according to one embodiment of the process of the invention.

EXAMPLE 1

The concentrated milk product of the invention is produced using a direct steam injection process. The process of the invention is effected using a UHT direct steam injection apparatus as used in the dairy industry. For example, one type of such apparatus used for heat treatment is the direct heating plant in which high pressure potable steam is mixed with the liquid milk product by injecting the steam into the liquid milk product. An example of direct steam injection apparatus is the Tetra Pak VTIS direct steam injection system. The water added to the liquid milk product via the steam is removed later in the process by evaporation, usually under reduced pressure, which also cools the product. The direct steam injection apparatus provides a continuous heat treatment process.

Referring to FIG. 1 of the drawings, raw whole cow's milk containing 3.2% by weight milk fat and 8.7% w/w total solids is drawn from a storage tank and passed through a separator, where cream is separated out. Although in certain cases, whole milk may be used directly in the concentration and sterilization processes of the invention, skim milk is the preferred starting material for use in the processes of the invention.

Again referring to FIG. 1, the skim milk is passed through a concentration process using reverse osmosis, where greater than 50% of the water is removed and the concentration of the total solids is increased to at least 20% w/w. The concentration step is carried out by reverse osmosis at a temperature of less than 45° F. and at a pressure of about 450 psi.

In the heat treatment step, the liquid milk concentrate is pumped through a preheater stage bringing its temperature to about 177° F. The milk is passed, at 177° F., to a direct steam injection chamber where the temperature of the milk is increased rapidly to above 288° F. with a holding time of 4-6 seconds.

In the cooling step, the sterilized milk concentrate is sent to a flash chamber down leg for less than 5-10 seconds, where the excess water/steam is flashed off by evaporation. Still under aseptic conditions, the sterilized concentrated milk stream is optionally passed to a homogenizer. In the homogenization step, the fat is distributed evenly throughout the product. Following this step, the homogenized milk product is transferred to a heat exchanger where the temperature is lowered to 76-80° F.

In the packaging step, the homogenized milk stream is directed to an aseptic packaging station where it is filled into sterile containers under sterile conditions at 80° F. and the containers are sealed. In certain cases, the homogenized milk stream is packaged at 45° F.

EXAMPLE 2

The description set forth below represents an example of processing specifications used in an embodiment of the invention and the products derived therefrom.

The pH of milk at 25° C. is usually in the range of 6.5-6.7, with a mean value of 6.6. Reliable pH measurement is critical for quality control of fresh milk. The lowering of pH that sometimes can occur when carrying out the UHT processes in the prior art leads to the deterioration of the structure of the casein protein, which in turn causes proteins to irreversibly precipitate out of solution. Thus, an ideal specification for pH on raw ranch milk is 6.6 to 6.7, and for the finished raw concentrate is 6.45 to 6.8.

Titratable acidity is used to estimate freshness of milk. Fresh milk has a titratable acidity of 0.14-0.16% expressed as % lactic acid. Developed acidity indicates growth of lactic acid bacteria. Raw milk with acidity of 0.17% or above would be unsuitable for UHT processing as it would coagulate during heating. Thus, an ideal titratable acidity is ≦0.14 for the raw milk and ≦0.36 for the raw concentrate, when the raw milk is concentrated ≦2.5-fold.

Age of the raw starting material affects final pH level and bacteria levels and is thus important to the final product. According to US federal standards, milk can be held up to 72 hours before receipt for processing. However, an ideal specification for the age of raw milk prior to processing is ≦12 hours.

Milk secreted by healthy cows is basically sterile. However, bacteria can be introduced into raw milk from a variety of sources, including exterior and interior of the udder, soil, bedding, manure, milking equipment and storage tanks. The total number of bacteria in raw milk is assessed by direct microscopic count or standard plate count. The standard total plate count (TPC) method is the preferred procedure for the measurement of bacterial levels. The standard plate count of raw milk is referenced in the literature as important in UHT processing, but with no specific recommendations on acceptable maximum levels. The US federal allowable standard is 100,000. An ideal specification for the bacterial count is ≦7500.

Just like bacterial levels, somatic cell levels (SCC) have been found to be a contributor to the creation of off flavors, as well as gelation in UHT studies. Again, there are no defined target ranges specified. Federal US standards allow for a 750,000 somatic cell count. An ideal specification for somatic cell count is ≦150,000.

Two types of enzymes have been found to create issues in UHT products. High levels of proteinase (plasmin) will reduce the stability in storage. This is caused by the hydrolysis of the peptide bonds, particularly in β-casein. Plasmin partially survives high temperature treatment. The level of plasmin is higher in late lactation, in older cows and in mastitic milk. Thus, it would be ideal to monitor age and lactation information of the source raw starting material prior to processing.

EXAMPLE 3

A concentrated, sterilized milk product was produced by the process set forth in Example 1. The aseptic milk product that was sealed in sterile containers at 80° F. was stored at room temperature (25° C.) in an unopened state for a period of 6 months. When the containers were unsealed after 6 months, the product was found to be free of visual defects, had not separated out of solution and did not contain any particulates, and when reconstituted with water, possessed the aroma, taste and texture of fresh milk.

A concentrated, sterilized milk product produced by the process of Example 1 was stored at 45° F. for a period of 60 days. This product was also found to be free of visual defects, and possessed the taste and aroma characteristics of fresh milk.

TABLE 1

Single pass Reverse Osmosis performed at 45° F. to concentrate milk to 2.5×

| Feed to RO | | |
| --- | --- | --- |
| Fat | 3.5% | 4,288 lbs |
| Protein | 3.1% | 3,798 lbs |
| Other Solids | 5.5% | 914 lbs |
| SNF | 8.6% | 319 lbs |
| Total Solids | 12.1% | 7,134 lbs |
| RO Retentate | | |
| Fat | 8.75% | 4,287.5 lbs |
| Protein | 7.75% | 3,797.5 lbs |
| Other Solids | 13.75% | 6737.5 lbs |
| SNF | 21.5% | 10535 lbs |
| Total Solids | 30.25% | 14,822.5 lbs |
| RO Permeate | | |
| Fat | 0% | 0 lbs |
| Protein | 0% | 0 lbs |
| Other Solids | 0.0198% | 14.55 lbs |
| SNF | 0.0198% | 14.55 lbs |
| Total Solids | 0.0198% | 14.55 lbs |

What is claimed is:

1. A process for producing a concentrated and sterilized milk product comprising the steps of:
 (a) performing a concentration process by reverse osmosis on a starting material comprising milk or a milk product and forming a more concentrated milk product, wherein, the concentration process is performed at a temperature of no greater than 45° F. using a membrane having a molecular weight cut-off of 100 Da, wherein the starting material is subjected to a pressure of 450 psi to 1500 psi, and further wherein the concentration process removes water from the starting material; and (b) performing a sterilization process on said more concentrated milk product by heating, wherein the sterilization process comprises a first heating step that heats the more concentrated milk product from a temperature of about 45° F. to a first elevated temperature between 175° F. to 177° F. within 45 seconds.

2. A process according to claim 1, wherein the volume of the more concentrated milk product is 50% of the volume of the starting material.

3. A process according to claim 1, wherein the milk is whole milk or skim milk.

4. A process according to claim 1, further comprising the step of adjusting the total solids content of the more concentrated milk product prior to step (b).

5. A process according to claim 1, wherein the more concentrated milk product comprises from 20 to 25% w/w of solids-not-fat (SNF).

6. A process according to claim 1, further comprising a second heating step that heats the more concentrated milk product from the first elevated temperature to a second elevated temperature.

7. A process according to claim 6, wherein said second heating step is carried out in under 5 seconds at a second elevated temperature ranging between 283° F. to 288° F.

8. A process according to claim 7, further comprising a holding step, wherein the more concentrated milk product is maintained at the second elevated temperature for at least 4 seconds.

9. A process according to claim 8, further comprising a cooling step, wherein the more concentrated milk product is subjected to an evaporation process.

* * * * *